United States Patent
Li et al.

(10) Patent No.: US 8,379,643 B2
(45) Date of Patent: Feb. 19, 2013

(54) METHOD FOR CONTROLLING TRANSMISSION SPEED OF MULTI-CAST PACKETS

(75) Inventors: Lian Cheng Li, Tianjin (CN); Chih Feng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 321 days.

(21) Appl. No.: 12/964,510

(22) Filed: Dec. 9, 2010

(65) Prior Publication Data

US 2012/0147781 A1 Jun. 14, 2012

(51) Int. Cl.
*G06F 15/16* (2006.01)
*H04L 12/28* (2006.01)
*G08C 17/00* (2006.01)

(52) U.S. Cl. ............. 370/390; 370/419; 709/233

(58) Field of Classification Search .......... 370/419, 370/420, 390, 310, 350, 391, 470, 472; 455/343.1, 455/345, 456.1, 458; 709/220, 223, 224, 709/226, 232, 233
See application file for complete search history.

(56) References Cited

U.S. PATENT DOCUMENTS

| | | | |
|---|---|---|---|
| 7,130,668 B2 * | 10/2006 | Chang et al. | 455/574 |
| 7,430,421 B2 * | 9/2008 | Park | 455/456.1 |
| 2006/0094450 A1 * | 5/2006 | Park et al. | 455/458 |
| 2009/0029671 A1 * | 1/2009 | Cho et al. | 455/345 |
| 2009/0325533 A1 * | 12/2009 | Lele et al. | 455/343.1 |

* cited by examiner

*Primary Examiner* — Hanh N Nguyen
(74) *Attorney, Agent, or Firm* — Morris Manning & Martin LLP; Tim Tingkang Xia, Esq.

(57) ABSTRACT

A transmission speed controlling method for multi-cast packets includes the steps of calculating a standard time, and recording an accumulated error time; transmitting one of the multi-cast packets, and calculating a transmission time of the transmitted multi-cast packet; calculating a difference between the standard time and the transmission time, recording the difference as a current error time, adding the accumulated error time and the current error time, and recording the add result as a preset sleep time; and performing the following steps when the preset sleep time is greater than an error threshold value, wherein the following steps are sleeping for the preset sleep time; being awaked from sleep, and calculating a practical sleep time; calculating a new accumulated error time by subtracting the practical sleep time from the preset sleep time; and returning to the first step to transmit the next one of the multi-cast packets.

7 Claims, 3 Drawing Sheets

METHOD FOR CONTROLLING TRANSMISSION SPEED OF MULTI-CAST PACKETS

BACKGROUND OF THE INVENTION

1. Field of Invention

The present invention relates to a method for controlling transmission speed of multi-cast packets, and more particularly to a high-precision method for controlling the transmission speed of the multi-cast packets.

2. Related Art

In the field relating to the transmission technology of network packets, how to control of transmission speed is an important topic. The transmission speed of network data is obtained by calculating a ratio between a data transmission amount and a transmission time. Currently, a Microsoft Windows system uses a Sleep function to control the transmission speed of the network packet. The Sleep function does not occupy network resources during a sleep process, but the Sleep function has very low precision, and probably can only reach a precision of a millisecond (ms) level. An error in practical execution of the Sleep function may generally reach 10 ms, and therefore, the Sleep function is not suitable for applications requiring a high and stable transmission speed.

The Windows system also provides a counter with the accuracy that can be synchronized with a machine clock, and the counter can reach a precision of a nanosecond (ns) level. However, the method of using the counter for sleep requires frequent counting and confirmation of whether the sleep time is reached by the system, so that central processor unit (CPU) resources are largely occupied, and then operation of other software and the system is affected.

That is to say, during convention control of the transmission speed of network packets such as multi-cast packets, a problem of fluctuation of the transmission speed easily caused by the low sleep precision, or a defect of requiring excessive consumption of CPU resources exists.

SUMMARY OF THE INVENTION

In order to solve the above problems, the present invention is directed to a method for controlling transmission speed of multi-cast packets, and in the method a network interface card (NIC) is enabled to transmit a plurality of multi-cast packets at a target speed. The method for controlling the transmission speed of the multi-cast packets includes: calculating a standard time according to sizes of the multi-cast packets and the target speed, and recording an accumulated error time; transmitting one of the multi-cast packets, and calculating a transmission time of the transmitted multi-cast packet; calculating a difference between the standard time and the transmission time, recording the difference between the standard time and the transmission time as a current error time, adding the accumulated error time and the current error time, and recording the add result as a preset sleep time; and when the preset sleep time is greater than an error threshold value, performing the following steps: sleeping for the preset sleep time; being waked from sleep, and calculating a practical sleep time; calculating the new accumulated error time by subtracting the practical sleep time from the preset sleep time; and returning to the step of calculating the standard time according to the sizes of the multi-cast packets and the target speed, and recording the accumulated error time, so as to transmit the next one of the multi-cast packets.

The step of calculating a standard time according to the sizes of the multi-cast packets and the target speed, and recording an accumulated error time further includes: establishing an accumulated transmission time. Before the step of transmitting one of the multi-cast packets, and calculating a transmission time of the transmitted multi-cast packet, the processing method of the multi-cast packet may further include: calculating the accumulated transmission time; and resetting the accumulated error time and the accumulated transmission time to zero when the accumulated transmission time is greater than the accumulated time threshold value.

According to an embodiment, the method for controlling the transmission speed of the multi-cast packets may further include: when the preset sleep time is not greater than the error threshold value, using the preset sleep time as the new accumulated error time. The transmission time may be obtained by subtracting a system time before the multi-cast packet is transmitted from the system time after the multi-cast packet is transmitted.

Moreover, the above accumulated time threshold value may be 1 second (s), the error threshold value may be 1 ms, and the practical sleep time may be greater than 10 ms.

In conclusion, in the method for controlling the transmission speed of the multi-cast packets, an originally low-precision Sleep function is used to realize high-precision multi-cast speed control. Through a technology of feeding back the accumulated error time to the Sleep function in real time, and emptying the accumulated error time regularly, the method for controlling the transmission speed of the multi-cast packets can ensure effective and stable network data transmission without occupying excessive CPU resources.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described in detail in the following embodiments. The content is sufficient for any person skilled in the art to understand the technical content of the present invention and implement thereby. Any person skilled in the art can easily understand relevant objectives and advantages of the present invention according to the content disclosed in the specification, the claims, and accompanying drawings.

The present invention relates to a method for controlling transmission speed of multi-cast packets, in which an network interface card (NIC) is enabled to transmit a plurality of multi-cast packets at a target speed.

Figure 1:
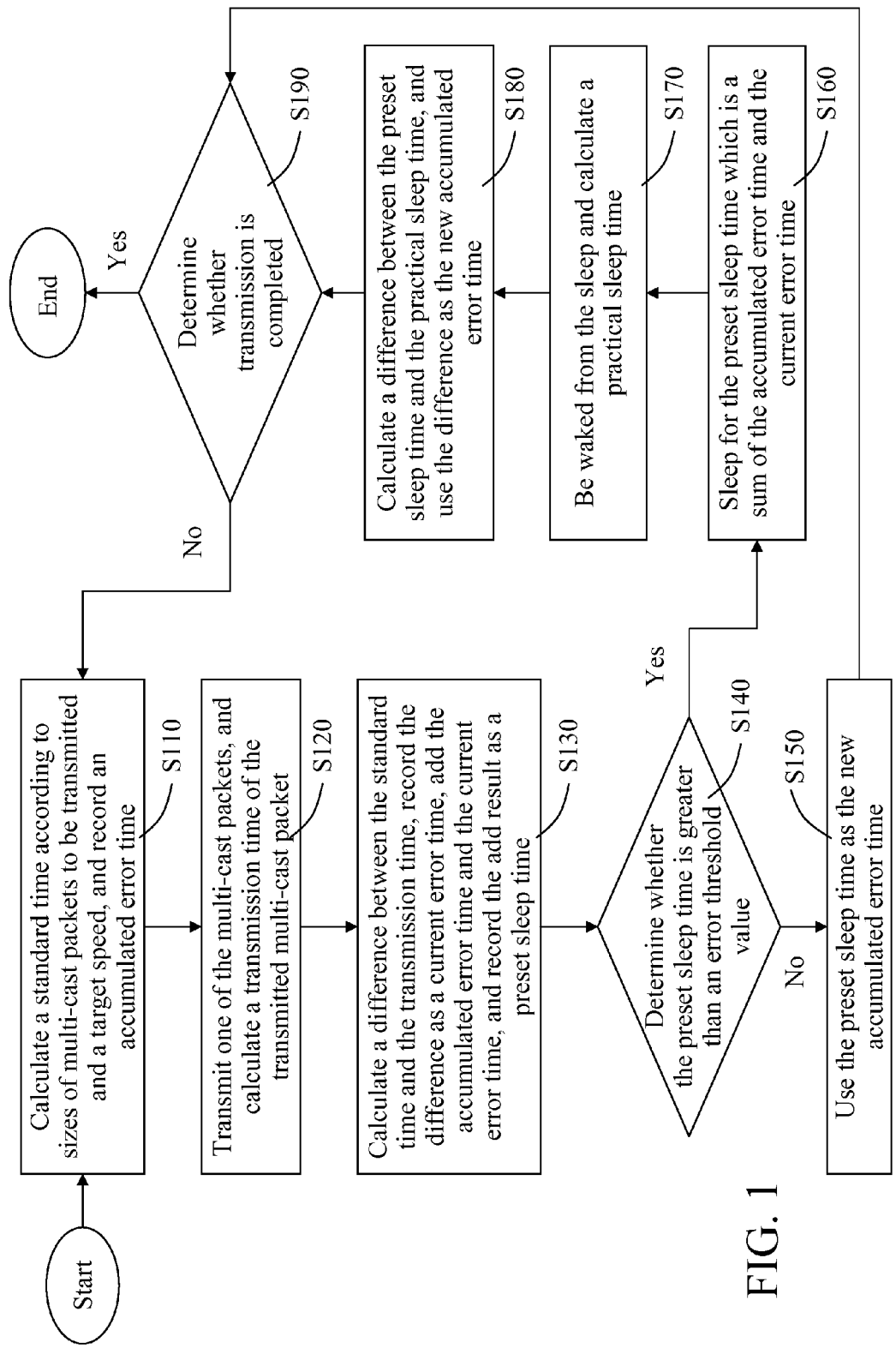
FIG. 1 is a flow chart of method for controlling transmission speed of multi-cast packets according to an embodiment of the present invention.

FIG. 1 is a flow chart of the method for controlling transmission speed of multi-cast packets according to an embodiment of the present invention.

In the method for controlling the transmission speed of the multi-cast packets, a standard time is first calculated according to sizes of multi-cast packets to be transmitted and the target speed, and an accumulated error time is recorded (Step S110). The standard time is a quotient by dividing the size of the multi-cast packet by the target speed. Next the NIC practically transmits one of the multi-cast packets at the target speed, and calculates a transmission time of the transmitted multi-cast packet (Step S120).

The transmission time may be obtained by subtracting a system time before the multi-cast packet is transmitted from the system time after the multi-cast packet is transmitted. Particularly, the system time maintained by a computer including the NIC is read before and after the multi-cast packet is transmitted, and then a practical transmission time of the transmitted multi-cast packet is obtained by subtracting the time before the transmission from the time after the transmission.

Then a difference between the standard time and the transmission time is calculated, the difference between the standard time and the transmission time is recorded as a current error time, the accumulated error time and the current error time are added, and the add result is recorded as a preset sleep time (Step S130). That is to say, in Step 130, the accumulated error time is fed back to the preset sleep time, so as to sensitively reflect and adjust the transmission speed.

After the preset sleep time is obtained, it is determined whether the preset sleep time is greater than an error threshold value (Step S140). According to an embodiment, the error threshold value may be 1 ms. The precision of controlling the transmission speed can be practically managed through the error threshold value, which can be set according to a practical demand of transmitting the multi-cast packets, therefore the error threshold value is not limited here.

When the preset sleep time is greater than the error threshold value, the NIC is enabled to sleep for a preset sleep time, in which the preset sleep time is a sum of the accumulated error time and the current error time (Step S160). Step S160 can be implemented through an application program interface (API) such as a Sleep function in a Windows system. On the contrary, when the preset sleep time is not greater than the error threshold value, the preset sleep time is used as the new accumulated error time (Step S150).

It can be known from Steps S150 and S160, in the method for controlling the transmission speed of the multi-cast packets, the current error time generated in each sleep is kept instead of being discarded. The current error time is fed back to next sleep control in real time, so as to dynamically compensate for the error, thereby reducing the sleep error and increasing control precision. Moreover, as the error compensation mechanism is used, an error that is generated by a reduced measurement time can also be compensated effectively.

The NIC is waked from sleep after sleeping for the preset sleep time, and a practical sleep time is calculated (Step S170). Similarly, the practical sleep time may also be obtained by subtracting the system time before the sleep of the NIC from the system time after the sleep of the NIC. As measurable precision of the Sleep function is greater than 10 ms, the practical sleep time is generally greater than 10 ms.

In the method for controlling the transmission speed of the multi-cast packets, a difference between the preset sleep time and the practical sleep time is calculated, and the difference between the preset sleep time and the practical sleep time is used as the new accumulated error time (Step S180). It is determined whether all multi-cast packets are transmitted after each multi-cast packet is transmitted (Step S190). If yes, the control is ended; otherwise, the process returns to Step S110 to transmit the next one of the multi-cast packets.

It should be noted that all the exemplary values of the above error threshold value, practical sleep time, and accumulated time threshold value can be set according to the practical demand of transmitting the multi-cast packets, and the values are not limited here. By adjusting the values, a range of dynamic error compensation and how soon a target setting speed is restored can be set.

Figure 2:
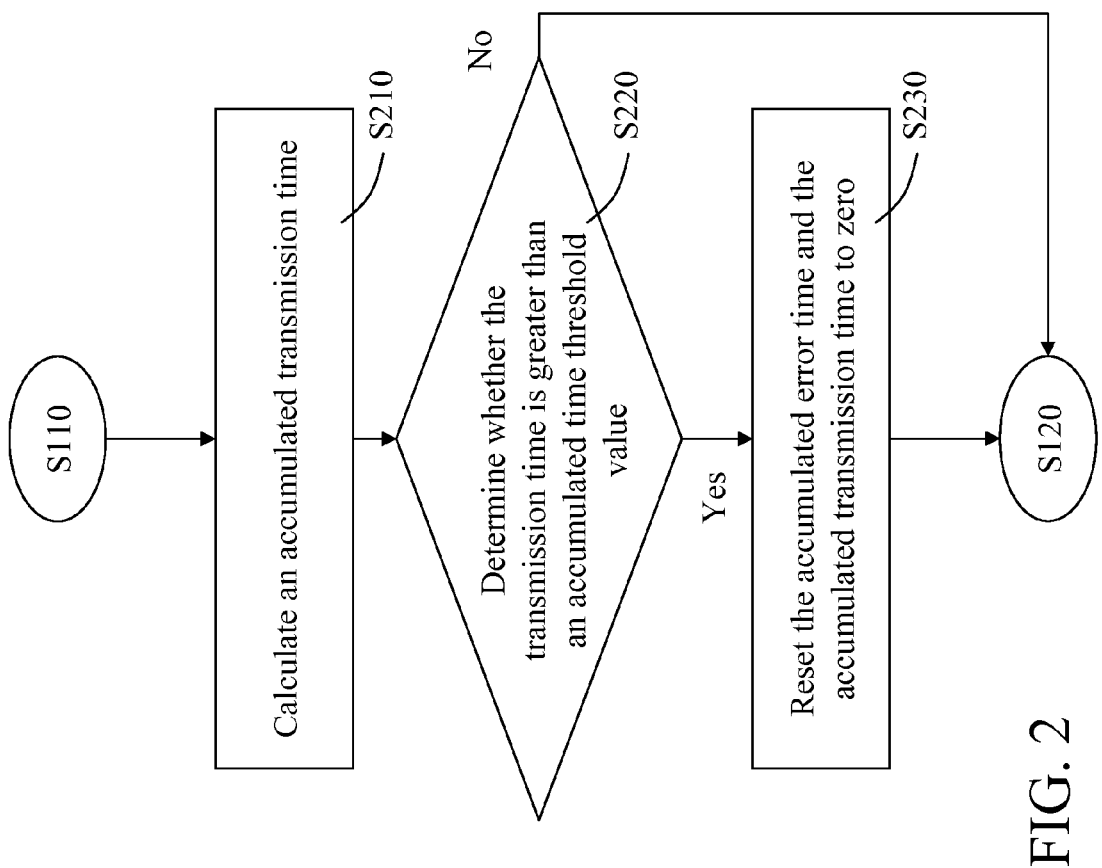
FIG. 2 is a partial flow chart of method for controlling transmission speed of multi-cast packets according to another embodiment of the present invention.

FIG. 2 is a flow chart of method for controlling transmission speed of multi-cast packets according to another embodiment of the present invention. In the embodiment, an accumulated transmission time may also be established at the same time in Step S110. Before the multi-cast packets are practically transmitted (Step S120), the following steps may be performed to reset the accumulated error time.

Before each time the multi-cast packet is transmitted, the accumulated transmission time is calculated first (Step S210), that is, duration from that the accumulated transmission time is established or reset to zero to a current time. Then it is determined whether the transmission time is greater than an accumulated time threshold value (Step S220). When the transmission time is greater than the accumulated time threshold value, the accumulated error time and the accumulated transmission time are reset to zero (Step S230).

According to an embodiment, the error threshold value may be 1 ms. The accumulated error threshold value may also be set according to the practical demand of transmitting the multi-cast packets, which is not limited here. As the accumulated error time is reset to zero at regular intervals, dynamic error compensation of the accumulated error time within a short period of time can be ensured.

Figure 3:
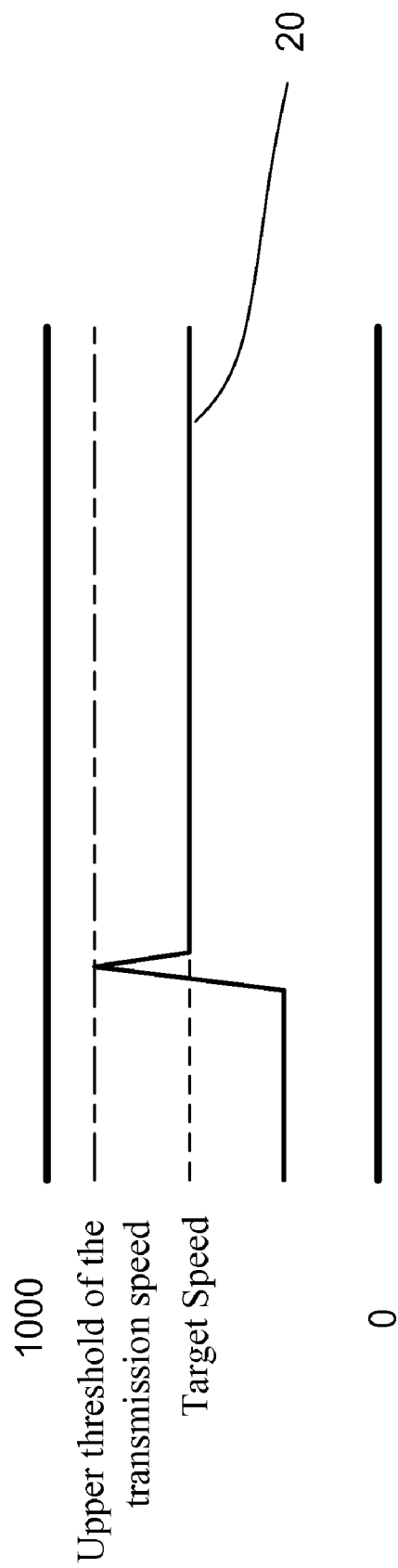
FIG. 3 is a curve diagram of transmission speed according to an embodiment of the present invention.

FIG. 3 is a curve diagram of transmission speed according to an embodiment of the present invention. It can be known from the transmission speed curve 20 in FIG. 3 that the NIC cannot transmit multi-cast packets rapidly due to actions such as environment configuration when just being started. Subsequently, in order to transmit the accumulated multi-cast packets in real time, the NIC does not need to execute the Sleep function at all, and transmits packets as fast as possible to reach an upper threshold of the transmission speed of the NIC. However, in order to adjust the excessively high transmission speed, in the method for controlling the transmission speed of the multi-cast packets, the transmission speed is rapidly restored to the target speed through the accumulated error time.

In conclusion, in the method for controlling the transmission speed of the multi-cast packets, the accumulated error time is fed back to the Sleep function in real time, and the accumulated error time is emptied regularly. Therefore, the method for controlling the transmission speed of the multi-cast packets can ensure effective and stable network data transmission without occupying excessive CPU resources. In other words, the method for controlling the transmission speed of the multi-cast packets can achieve an effect of a low resource utilization rate and high precision control at the same time. Furthermore, the method can lower pressure for a multi-cast server of the NIC, so as to ensure effective and stable transmission of the multi-cast data, and reduce error possibility of the transmission of the network data.

What is claimed is:

1. A method for controlling transmission speed of multi-cast packets, used for enabling a network interface card (NIC)

to transmit a plurality of multi-cast packets at a target speed, and the method for controlling the transmission speed of the multi-cast packets comprises:

calculating a standard time according to sizes of the multi-cast packets and the target speed, and recording an accumulated error time;

transmitting one of the multi-cast packets, and calculating a transmission time of the transmitted multi-cast packet;

calculating a difference between the standard time and the transmission time, recording the difference between the standard time and the transmission time as a current error time, adding the accumulated error time and the current error time, and recording the add result as a preset sleep time; and when the preset sleep time is greater than an error threshold value, performing following steps:

sleeping for the preset sleep time;

being waked from sleep, and calculating a practical sleep time;

calculating a difference between the preset sleep time and the practical sleep time, and using the difference between the preset sleep time and the practical sleep time as the new accumulated error time; and returning to the step of calculating the standard time according to the sizes of the multi-cast packets and the target speed, and recording the accumulated error time, so as to transmit the next one of the multi-cast packets.

2. The method for controlling the transmission speed of the multi-cast packets according to claim 1, wherein the step of calculating a standard time according to the sizes of the multi-cast packets and the target speed, and recording the accumulated error time further comprises: establishing an accumulated transmission time; and before the step of transmitting one of the multi-cast packets, and calculating the transmission time of the transmitted multi-cast packet, the processing method of the multi-cast packets further comprises:

calculating the accumulated transmission time;

and resetting the accumulated error time and the accumulated transmission time to zero when the accumulated transmission time is greater than an accumulated time threshold value.

3. The method for controlling the transmission speed of the multi-cast packets according to claim 2, wherein the accumulated time threshold value is 1 s.

4. The method for controlling the transmission speed of the multi-cast packets according to claim 1, wherein the error threshold value is 1 ms.

5. The method for controlling the transmission speed of the multi-cast packets according to claim 1, further comprising:

using the preset sleep time as the new accumulated error time when the preset sleep time is not greater than the error threshold value.

6. The method for controlling the transmission speed of the multi-cast packets according to claim 1, wherein the transmission time is obtained by subtracting a system time before the multi-cast packet is transmitted from the system time after the multi-cast packet is transmitted.

7. The method for controlling the transmission speed of the multi-cast packets according to claim 1, wherein the practical sleep time is greater than 10 ms.

\* \* \* \* \*